(12) United States Patent
Vican et al.

(10) Patent No.: US 9,004,580 B2
(45) Date of Patent: Apr. 14, 2015

(54) INSTRUMENTAL PANEL SUPPORT STRUCTURE

(71) Applicant: GM Global Technology Operations LLC, Detroit, MI (US)

(72) Inventors: Rudy M. Vican, Oxford, MI (US); Michael R Kaphengst, Leonard, MI (US); Rick J. Ferrara, Warren, MI (US); Denis L. Arnold, Davison, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/757,996

(22) Filed: Feb. 4, 2013

(65) Prior Publication Data

US 2014/0217780 A1 Aug. 7, 2014

(51) Int. Cl.
*B60K 37/00* (2006.01)
*B62D 25/14* (2006.01)

(52) U.S. Cl.
CPC ................... *B62D 25/147* (2013.01)

(58) Field of Classification Search
CPC .............................. B62D 25/145; B62D 25/14
USPC .......................... 296/193.02, 72, 70; 280/752
See application file for complete search history.

(56) References Cited

U.S. PATENT DOCUMENTS

2010/0001552 A1* 1/2010 Kim .......................... 296/193.02
2010/0289296 A1* 11/2010 Brancheriau ............. 296/193.02

* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A support structure is configured for locating an instrument panel within a passenger compartment of a vehicle. The support structure includes a support bracket and an end bracket. The support bracket is attached to a body panel of the vehicle. The support bracket includes a lateral biasing guide. The end bracket is attached to an end of the instrument panel. The end bracket has a first side. The first side abuts the lateral biasing guide of the support bracket such that the lateral biasing guide biases the instrument panel in a lateral direction until the end bracket abuts the lateral datum surface of the first body panel.

20 Claims, 6 Drawing Sheets

INSTRUMENTAL PANEL SUPPORT STRUCTURE

TECHNICAL FIELD

The present disclosure relates to a support structure for a vehicle.

BACKGROUND

Instrument panels, alternately referred to as dashboards, are situated within a passenger compartment of a vehicle and positioned facing the vehicle occupants, primarily a driver/operator, for easy readability and accessibility of the various instruments housed within the instrument panel. Common instrumentation found in a vehicle passenger compartment includes, for example, speedometers, odometers, tachometers, fuel gauges, and indicator lamps. An instrument panel may also house such other non-metering devices as air bags, glove compartments or boxes, radios, CD/DVD/cassette players, navigation screens, clocks, ashtrays, speakers, climate controls, and air vents. Instrument panels are typically formed with protective padding and other external trim material which is contoured and styled to provide a fully-assembled instrument panel with an aesthetically-pleasing appearance. Instrument gauges and meters are typically faced with a transparent material for protection from damage, dirt, and/or tampering.

Since the aforementioned instruments and devices may contribute a substantial amount of combined weight and mass to the vehicle, the instrument panel is therefore supported by a substantially rigid substructure positioned behind and beneath the visible portions of the panel. Support structures are often constructed from stamped and welded steel sheet metal assemblies and may include a plurality of supporting brackets or braces having a sufficient amount of surface area to allow the support structure to be attached to the vehicle and the instruments and other devices to be securely fastened within the panel.

SUMMARY

A support structure is configured for locating an instrument panel within a passenger compartment of a vehicle. The support structure includes a support bracket. The support bracket is configured for attachment to a body panel of the vehicle. The support bracket includes a lateral biasing guide. The end bracket is configured for attachment to an end of the instrument panel. The end bracket has a first side. The first side of the end bracket is configured to abut the lateral biasing guide of the support bracket such that the lateral biasing guide biases the instrument panel in a lateral direction until the end bracket abuts a lateral datum surface of the body panel.

A vehicle includes a passenger compartment, a first body panel, and a support structure. The first body panel is disposed in the passenger compartment. The first body panel includes a lateral datum surface. The support structure is configured for locating an instrument panel within the passenger compartment. The support structure includes a support bracket and an end bracket. The support bracket is attached to the first body panel of the vehicle. The support bracket includes a lateral biasing guide. The end bracket is attached to an end of the instrument panel. The end bracket has a first side. The first side of the end bracket is configured to abut the lateral biasing guide of the support bracket such that the lateral biasing guide biases the instrument panel in a lateral direction until the end bracket abuts the lateral datum surface of the first body panel.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
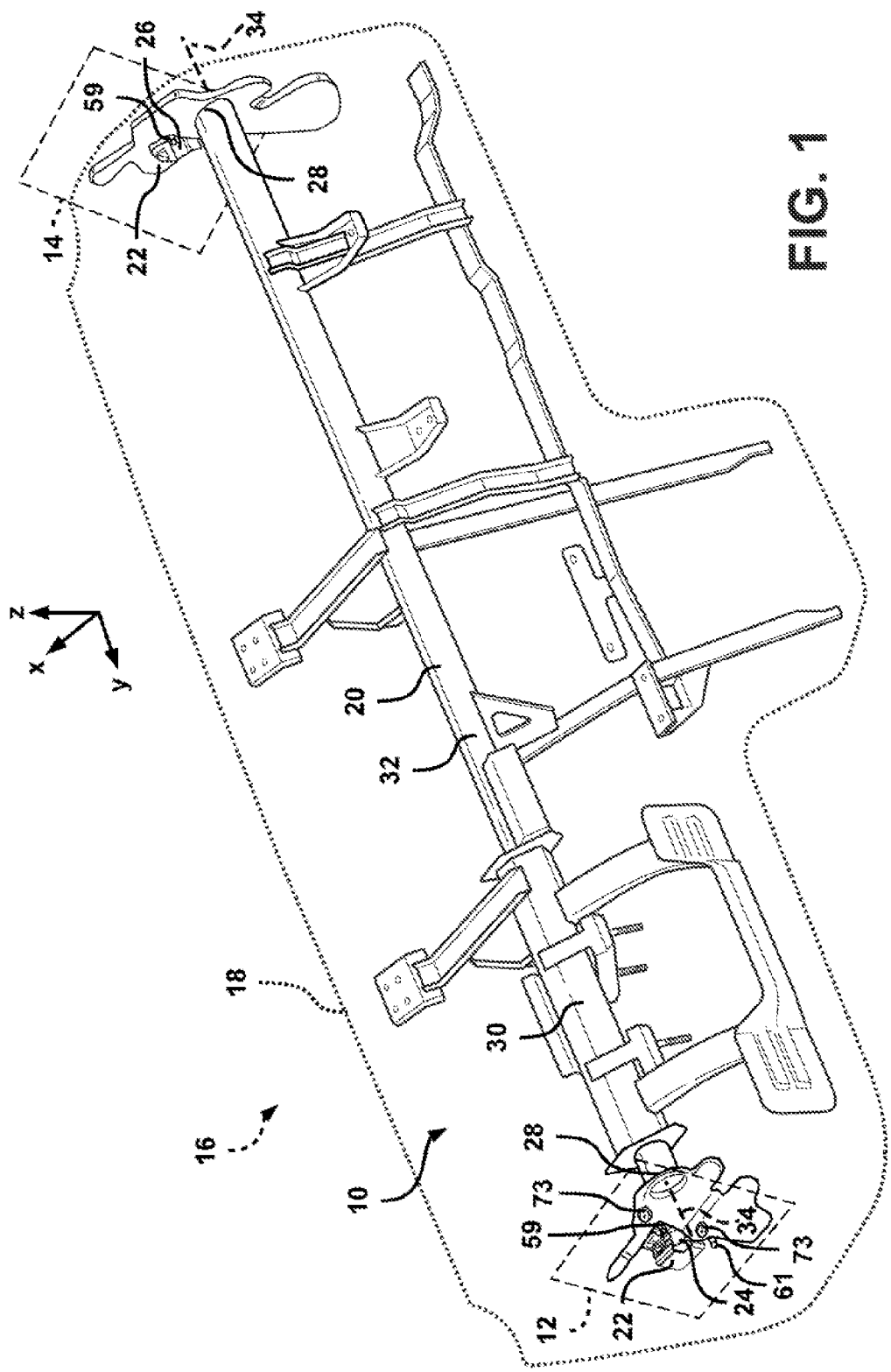
FIG. 1 is a schematic perspective view of a support structure having end brackets extending from opposing ends of a tubular support frame and a first and a second support bracket disposed within a passenger compartment of a vehicle.

Referring to the drawings, wherein like reference numbers refer to like components, FIG. 1 shows an instrument panel (IP) at 10. The IP 10 is configured to be mounted to a first body panel 12 and a second body panel 14 as part of a mounting configuration within a passenger compartment 16 of a vehicle 18. A support structure 20 is configured to position or locate the IP 10 on an x, y, and z coordinate system within the passenger compartment 16 of the vehicle 18. More specifically, the support structure 20 locates the IP 10 in a fore/aft direction x, a lateral direction y, i.e., left hand/right hand direction, and an up/down direction z within the passenger compartment 16 of the vehicle 18.

The support structure 20 includes a pair of end brackets 22 and a corresponding first support bracket 24 and second support bracket 26. The end brackets 22 are configured to extend from respective ends 28 of the IP 10. The support brackets 24, 26 are configured to extend from respective first and second body panels 12, 14. The first and second body panels 12, 14 may be a pair of first and second panels 12, 14 that are disposed in spaced and generally parallel relationship to one another across the passenger compartment 16, in the lateral direction y.

Referring again to FIG. 1, the IP 10 includes a tubular support frame 30 that extends between, and is mounted to, the first and second body panels 12, 14 at the opposing ends 28 thereof. The tubular support frame 30 may include a main tube 32 that extends along a lateral axis 34. When the IP 10 is located within the passenger compartment 16 of the vehicle 18, the lateral axis 34 extends in the lateral direction y and extends in generally perpendicular relationship to each of the first and second panels 12, 14. The tubular support frame 30 may also include a plurality of other tubes, plates, brackets 22, 24, 26, and the like. The end bracket 22 is disposed at each end 28 of the main tube 32. The end bracket 22 may be attached to the respective ends 28 of the main tube 32 frame via fastening, welding, and the like. At least a portion of each end bracket 22 may be disposed on the lateral axis 34. The end bracket 22 will be described in more detail below.

Figure 5:
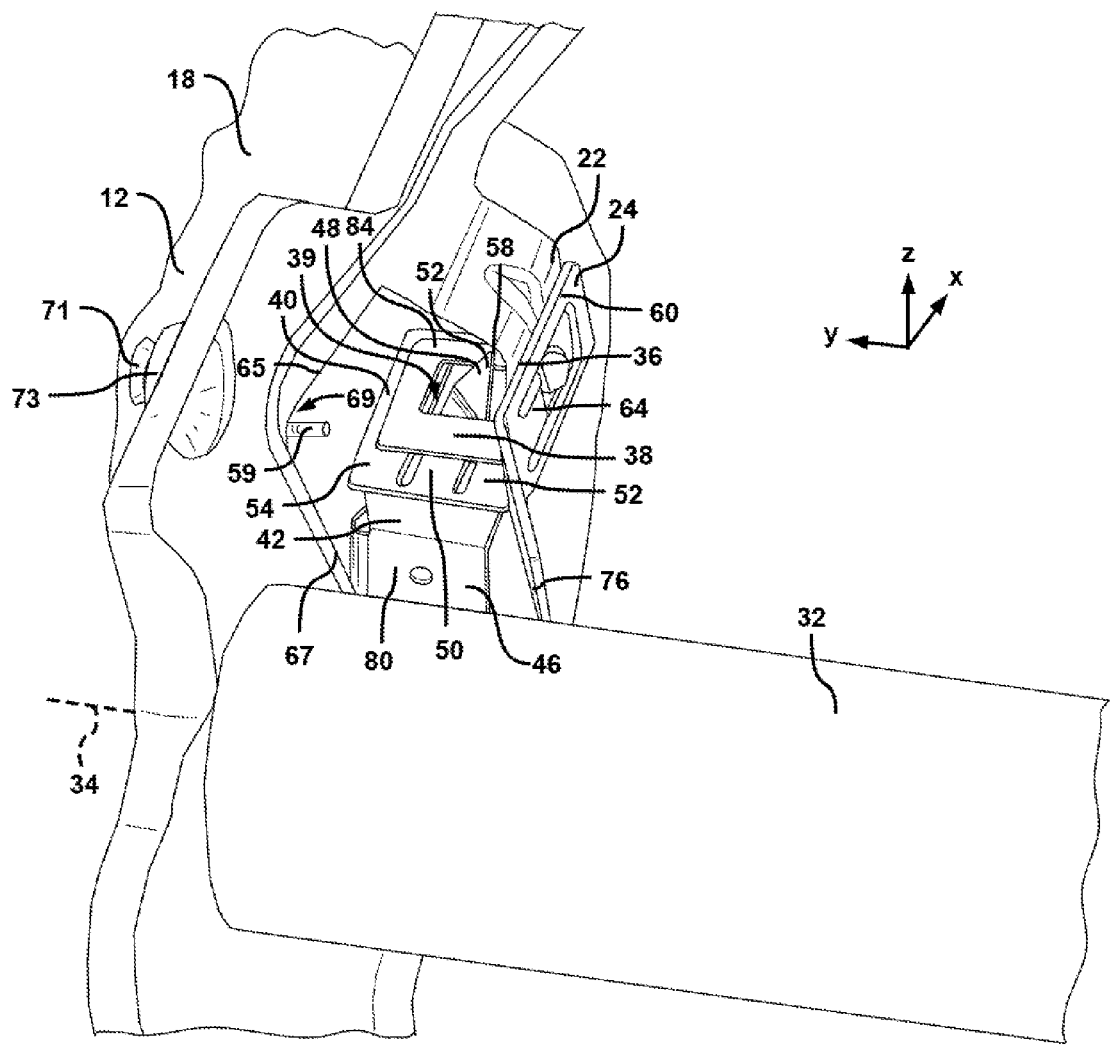
FIG. 5 is a schematic perspective view of the support structure of FIG. 1, illustrating one of the end brackets attached to the first support bracket.
Figure 6:
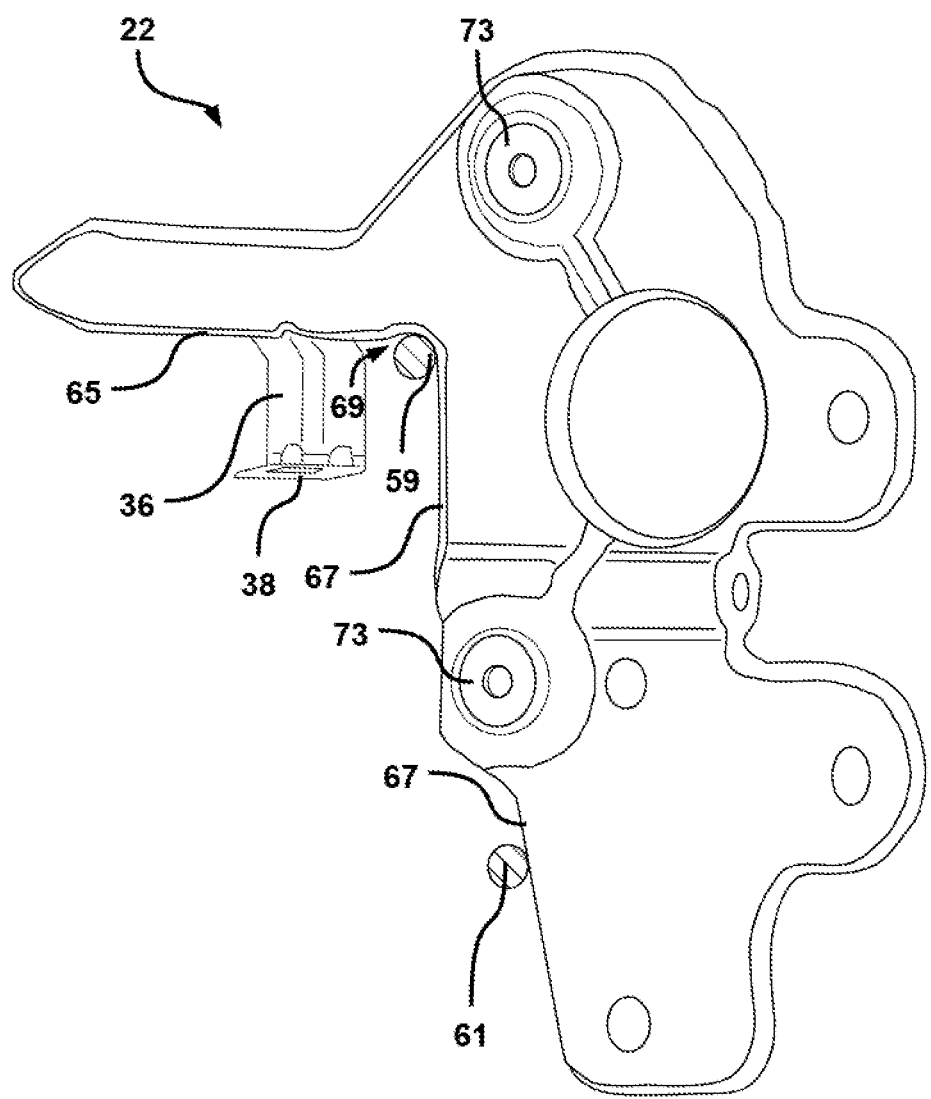
FIG. 6 is a schematic side view of the end bracket.

The first support bracket 24 is attached to the first body panel 12 and the second support bracket 26 is attached to the second body panel 14 via fastening, welding, and the like. Referring to FIGS. 1 and 5, the support brackets 24, 26 are configured to engage a respective one of the end brackets 22 to locate and support the IP 10 in the fore/aft direction x, the lateral direction y, and the up/down direction z within the passenger compartment 16 of the vehicle 18. The support brackets 24, 26 may be formed by stamping or any other process known to those skilled in the art.

Figure 4:
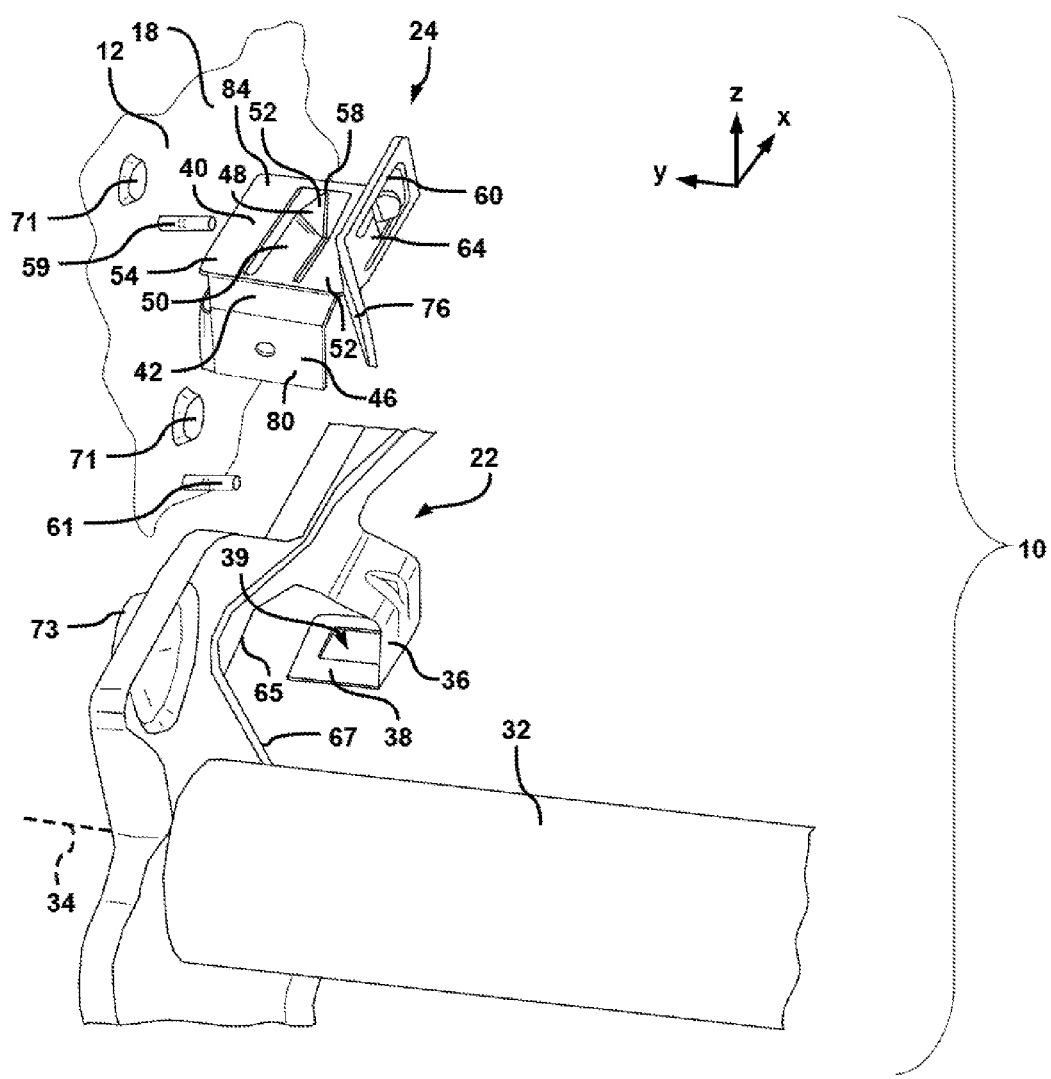
FIG. 4 is an exploded schematic perspective view of the support structure of FIG. 1, illustrating the first support bracket attached to a body panel and one of the end brackets attached to the support structure.

Referring to FIGS. 1, 4, and 5, the end brackets 22 are attached to a respective end 28 of the instrument panel. Each end bracket 22 has a first side 36 and a second side 38 extending from the first side 36. The second side 38 may extend in generally perpendicular relationship to the first side 36, such that the second side 38 extends away from the respective end 28 of the instrument panel. Additionally, the second side 38 defines a retention hole 39. The retention hole 39 may be square, rectangular, or any other suitable shape. Each end bracket 22 may be formed by stamping or any other process known to those skilled in the art.

Figure 2:
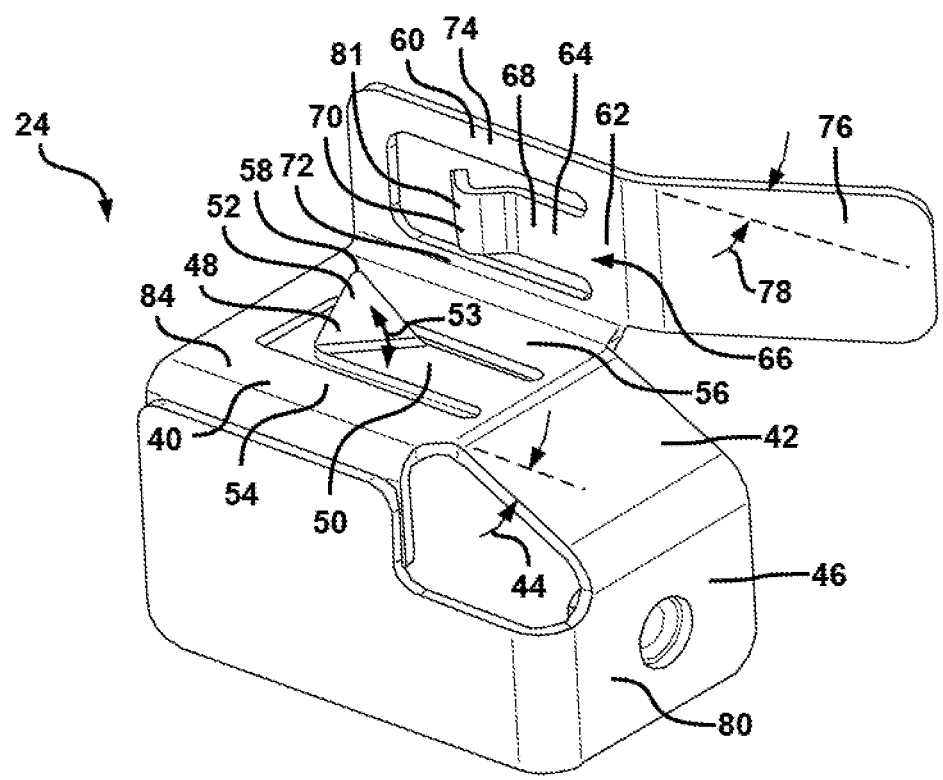
FIG. 2 is a schematic perspective view of the first support bracket of FIG. 1.
Figure 3:
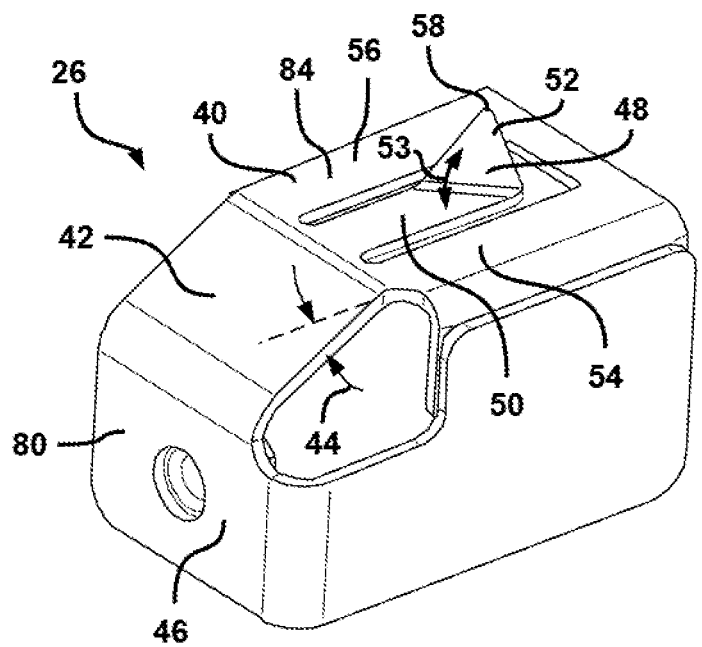
FIG. 3 is a schematic perspective view of the second support bracket of FIG. 1.

Referring to FIGS. 2-5, the first and second support brackets 24, 26 each include an upright surface 40. With reference to FIGS. 2 and 3, the first and second support brackets 24, 26 each include a support ramp 42 which extends from the upright surface 40 at a support angle 44. The support angle 44 may be an acute angle. As the instrument panel is moved in the forward x direction, the second side 38 of the respective end bracket 22 may contact the support ramp 42 such that the support ramp 42 guides the instrument panel in the upward z direction within the passenger compartment 16.

The support bracket further includes a rear face 46. The rear face 46 extends in generally perpendicular relationship to the upright surface 40 with the support ramp 42 interconnecting the upright surface 40 and the rear face 46.

Referring again to FIGS. 2 and 3, the upright surface 40 includes a locking finger 48, having a first section 50, and a retention feature 52 that extends from the first section 50. The upright surface 40 further includes a first leg 54 and a second leg 56, extending in spaced and generally parallel relationship to one another. The locking finger 48 is flexible, relative to the first side 36 and the second side 38. The locking finger 48 is disposed between the first leg 54 and the second leg 56 such that the locking finger 48 extends in spaced and generally parallel relationship to the first leg 54 and the second leg 56. More specifically, the retention feature 52 may extend to a peak 58 such that the retention feature 52 is pointed. Further, the retention feature 52 extends from the first section 50 at a retention angle 53, which may be an acute angle. The first leg 54, the second leg 56, and the first section 50 may be generally planar with one another. As such, the peak 58 is out of plane with each of the first leg 54, the second leg 56, and the first section 50. As the second side 38 moves in the forward direction x in the passenger compartment 16, the second side 38 contacts the retention feature 52 such that the locking finger 48 flexes in a direction away from the second side 38. The second side 38 eventually contacts the peak 58, as the IP 10 continues to move in the forward direction x, the retention feature 52 eventually enters the retention hole 39, thus locking the IP 10 to the vehicle 18.

Referring to FIGS. 1 and 4-6, the body panels 12, 14 include a first and second datum pin 59, 61, which extend inboard, in the lateral direction. The end bracket 22 has an upper edge 65, extending generally in the forward direction x, and a forward edge 67, extending generally in the downward direction z. Therefore, the upper edge 65 and the forward edge 67 extend in generally perpendicular relationship to one another. The upper edge 65 and the forward edge 67 intersect to define a groove 69 is configured such that the first datum pin 59 is nested therein, in abutting relationship with the upper edge 65 and the forward edge 67, to locate the IP 10 in the fore/aft direction x and in the up/down direction z within the passenger compartment 16. More specifically, the first datum pin 59 is nested within the groove 69 after the resilient finger 64 is disposed within the retention hole 39. The forward edge 67 of the end bracket 22 also contacts the second datum pin 61 to locate the IP 10 in the forward direction x. The first datum pin 59 and the second datum pin 61 cooperate to prevent the IP 10 from rotation about the lateral axis 34 when the IP 10 is inserted into the passenger compartment 16 such that the end bracket 22 is in contact with the pins 59, 61 and the support brackets 24, 26.

Referring to FIGS. 1, 2, 4, and 5, the first support bracket 24 is attached to the first body panel 12 and also includes a lateral biasing guide 60 that extends in generally perpendicular relationship to the upright surface 40. The lateral biasing guide 60 includes a base section 62 and a resilient finger 64. The base section 62 presents a lateral surface 66. The resilient finger 64 extends from the base section 62. The first side 36 of the end bracket 22 abuts the resilient finger 64 such that the resilient finger 64 biases the IP 10 in the lateral direction z within the passenger compartment 16, toward the first body panel 12.

Figure 7:
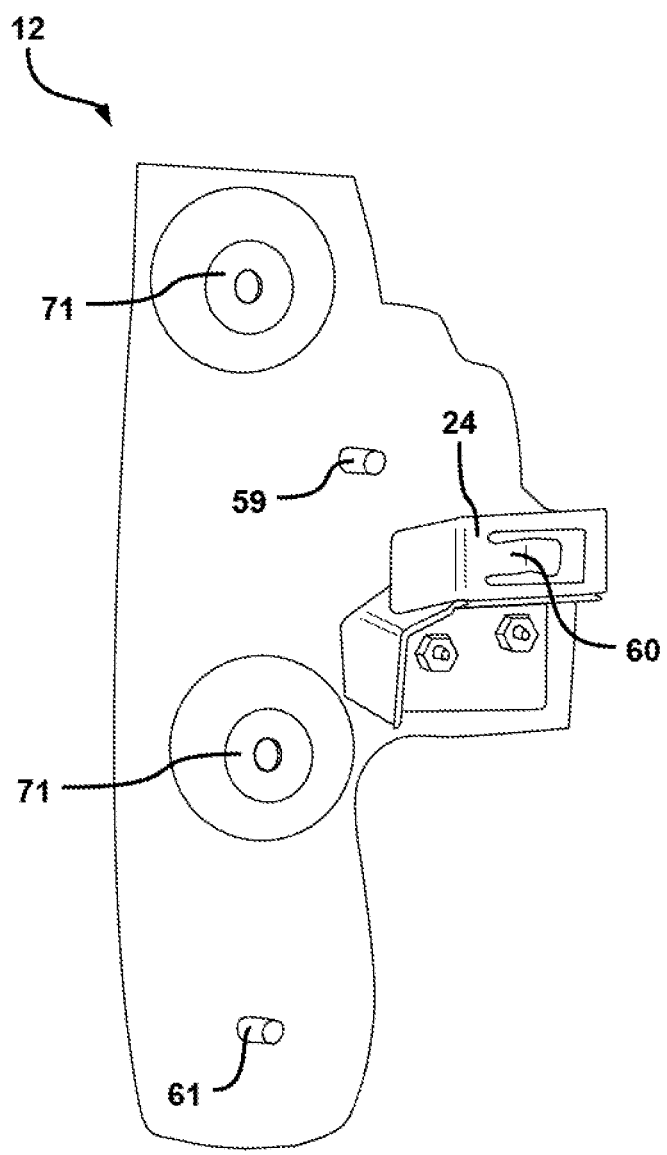
FIG. 7 is a schematic side view of the body panel with the first support bracket attached thereto.

Referring to FIGS. 4, 5, and 7, the first body panel 12 includes at least one lateral datum surface 71. Referring specifically to FIGS. 4 and 7, the first body panel 12 includes at least two lateral datum surfaces 71. The lateral datum surfaces 71 may be raised such that they extend inboard from the first body panel 12, in the lateral direction y. Likewise, the end bracket 22 includes a corresponding lateral datum feature 73 that extends in the lateral direction y. Therefore, the resilient finger 64 of the lateral biasing guide 60 biases the IP 10 in the lateral direction y such that the lateral datum feature 73 contacts the lateral datum surface 71 to locate the IP 10 in the y direction.

Further, to ensure the upper edge 65 and the forward edge 67 contact the corresponding datum pins 59, 61, the second side 38 of the end bracket 22 is spaced in the upward direction z from the upright surface 40 of the respective support bracket 24, 26. In a non-limiting example, the second side 38 may be spaced at least 2 millimeters from the upright surface 40. However, it should be appreciated that any desired clearance may be provided, providing that the second side 38 remains close enough the upright surface 40 to ensure the retention feature 54 can become disposed within the retention hole 39.

The resilient finger 64 includes an attachment section 68 extending from the base section 62 and a biasing hump 70 extending from the base section 62. The resilient finger 64 is flexible relative to the base section 62. The base section 62 and the attachment section 68 are generally planar with one another. The biasing hump 70 extends to a ridge 81 that is out of plane with the attachment section 68 and the base section 62. The lateral biasing guide 60 also includes a first ledge 72 and a second ledge 74 which extend from the base section 62 in spaced and generally parallel relationship to one another. The resilient finger 64 is disposed between the first ledge 72 and the second ledge 74 such that the resilient finger 64 extends in spaced and generally parallel relationship to the first ledge 72 and the second ledge 74. Therefore, as the instrument panel is moved in the forward direction x within the passenger compartment 16, the first side 36 of the end bracket 22 sequentially moves along the base section 62, then along each of the first side 36, the second side 38, and the attachment section 68, and then along the biasing hump 70. As the first side 36 of the end bracket 22 contacts the biasing hump 70, the first side 36 causes the attachment section 68 to flex away from the first body panel 12 such that the first side 36 contacts the ridge 81 of the biasing hump 70. However, once the first side 36 of the end bracket 22 contacts the biasing hump 70, the resiliency of the resilient finger 64 causes the biasing hump 70 to bias the IP laterally 10 in the y direction toward the first body panel 12.

The lateral biasing guide 60 also includes a lateral ramp 76 which extends from the base section 62, opposite the resilient finger 64, at a lateral angle 78. More specifically, the lateral ramp 76 extends away from the first body panel 12. The lateral angle 78 may be an acute angle. As the instrument panel is moved forward within the passenger compartment 16, the first side 36 of the end bracket 22 abuts the lateral ramp 76 of the biasing guide such that the lateral ramp 76 biases the IP 10 laterally in the y direction toward the first body panel 12.

The first side 36 of the end bracket 22 is configured to abut the lateral biasing guide 60 of the first support bracket 24 such that the lateral biasing guide 60 directs the IP 10 in the lateral direction y within the passenger compartment 16. Likewise, the second side 38 of the end bracket 22 is configured to abut the up/down datum feature 84 of the first support bracket 24 to locate the IP 10 in the up/down direction z within the passenger compartment 16.

While the best modes for carrying out the disclosure have been described in detail, those familiar with the art to which this disclosure relates will recognize various alternative designs and embodiments for practicing the disclosure within the scope of the appended claims.

The invention claimed is:

1. A support structure configured for locating an instrument panel within a passenger compartment of a vehicle, the support structure comprising:
    a support bracket configured for attachment to a body panel of the vehicle, the support bracket including a lateral biasing guide;
    wherein the lateral biasing guide is configured to be in spaced relationship to the body panel when the support bracket is attached to the body panel; and
    an end bracket configured for attachment to an end of the instrument panel, the end bracket having a first side;
    wherein the end bracket is configured to be disposed between the lateral biasing guide and the body panel when the support bracket is attached to the body panel and the first side of the end bracket is configured to abut the lateral biasing guide of the support bracket such that the lateral biasing guide biases the instrument panel in a lateral direction, toward the body panel, until the end bracket abuts a lateral datum surface of the body panel.

2. A support structure, as set forth in claim 1, wherein the lateral biasing guide includes a base section having a lateral surface and a resilient finger extending from the base section;
    wherein the first side of the end bracket is configured to abut the resilient finger when the support bracket is attached to the body panel such that the resilient finger biases the instrument panel in the lateral direction, toward the body panel, within the passenger compartment.

3. A support structure, as set forth in claim 2, wherein the resilient finger includes an attachment section extending from the base section and a biasing hump extending from the base section;
    wherein the base section and the attachment section are generally planar;
    wherein the biasing hump extends to a peak that is out of plane with the attachment section and the base section; and
    wherein the first side of the end bracket is configured for abutting the biasing hump of the biasing guide, when the support bracket is attached to the body panel, such that the biasing hump biases the instrument panel in the lateral direction, toward the body panel, as the instrument panel is moved forward within the passenger compartment.

4. A support structure, as set forth in claim 3, wherein the lateral biasing guide further includes a lateral ramp extending from the base section, opposite the resilient finger, at a lateral angle;
    wherein the first side is configured for abutting the lateral ramp of the biasing guide, when the support bracket is attached to the body panel, such that the lateral ramp guides the instrument panel laterally, toward the body panel, as the instrument panel is moved forward within the passenger compartment.

5. A support structure, as set forth in claim 4, wherein the lateral biasing guide further includes a first ledge and a second ledge extending from the base section in spaced and generally parallel relationship to one another;
    wherein the resilient finger is disposed between the first ledge and the second ledge such that the resilient finger extends in spaced and generally parallel relationship to each of the first ledge and the second ledge.

6. A support structure, as set forth in claim 1, wherein the support bracket further includes a upright surface and the end bracket further includes a second side extending in generally perpendicular relationship to the first side;
    wherein the upright surface includes a locking finger having a first section and a retention feature extending from the first section;
    wherein the second side defines a retention hole; and
    wherein the second side of the end bracket is configured for abutting the first section, when the support bracket is attached to the body panel, such that the first side causes the retention feature to engage the retention hole.

7. A support structure, as set forth in claim 6, wherein the second side is configured to be spaced from the upright surface when the retention feature engages the retention hole.

8. A support structure, as set forth in claim 7, wherein the retention feature is pointed and extends from the first section at a retention angle.

9. A support structure, as set forth in claim 6, wherein the upright surface further includes a first leg and a second leg extending in spaced and generally parallel relationship to one another;
    wherein the locking finger is disposed between the first ledge and the second ledge such that the locking finger extends in spaced and generally parallel relationship to each of the first leg and the second leg.

10. A support structure, as set forth in claim 1, wherein the end bracket is configured to abut a datum pin of the body panel, when the support bracket is attached to the body panel, to locate the instrument panel in an up/down direction and a fore/aft direction within the passenger compartment.

11. A vehicle comprising:
    a passenger compartment;
    a first body panel disposed in the passenger compartment;
    wherein the first body panel includes a lateral datum surface; and
    a support structure configured for locating an instrument panel within the passenger compartment, the support structure including:

a support bracket attached to the first body panel of the vehicle, the support bracket having a lateral biasing guide;

wherein the lateral biasing guide extends in spaced relationship to the first body panel when the support bracket is attached to the body panel; and an end bracket attached to an end of the instrument panel, the end bracket having a first side;

wherein the end bracket is configured to be disposed between the lateral biasing guide and the first body panel and the first side of the end bracket is configured to abut the lateral biasing guide of the support bracket such that the lateral biasing guide biases the instrument panel in a lateral direction, toward the first body panel, until the end bracket abuts the lateral datum surface of the first body panel.

12. A vehicle, as set forth in claim 11, wherein the lateral biasing guide includes a base section having a lateral surface and a resilient finger extending from the base section;

wherein the first side of the end bracket is configured to abut the resilient finger such that the resilient finger biases the instrument panel in the lateral direction, toward the first body panel, within the passenger compartment.

13. A vehicle, as set forth in claim 12, wherein the resilient finger includes an attachment section extending from the base section and a biasing hump extending from the base section;

wherein the base section and the attachment section are generally planar;

wherein the biasing hump extends to a peak that is out of plane with the attachment section and the base section; and wherein the first side of the end bracket is configured for abutting the biasing hump of the biasing guide such that the biasing hump biases the instrument panel in the lateral direction, toward the first body panel, as the instrument panel is moved forward within the passenger compartment.

14. A vehicle, as set forth in claim 13, wherein the lateral biasing guide further includes a lateral ramp extending from the base section, opposite the resilient finger, at a lateral angle;

wherein the first side is configured for abutting the lateral ramp of the biasing guide such that the lateral ramp guides the instrument panel laterally, toward the body panel, as the instrument panel is moved forward within the passenger compartment.

15. A vehicle, as set forth in claim 14, wherein the lateral biasing guide further includes a first ledge and a second ledge extending from the base section in spaced and generally parallel relationship to one another;

wherein the resilient finger is disposed between the first ledge and the second ledge such that the resilient finger extends in spaced and generally parallel relationship to each of the first ledge and the second ledge.

16. A vehicle, as set forth in claim 11, wherein the support bracket further includes a upright surface and the end bracket further includes a second side extending in generally perpendicular relationship to the first side;

wherein the upright surface includes a locking finger having a first section and a retention feature extending from the first section;

wherein the second side defines a retention hole; and wherein the second side of the end bracket is configured for abutting the first section such that the first side causes the retention feature to engage the retention hole.

17. A vehicle, as set forth in claim 16, wherein the second side is configured to be spaced from the upright surface when the retention feature engages the retention hole.

18. A vehicle, as set forth in claim 17, wherein the retention feature is pointed and extends from the first section at a retention angle.

19. A vehicle, as set forth in claim 18, wherein the upright surface further includes a first leg and a second leg extending in spaced and generally parallel relationship to one another;

wherein the locking finger is disposed between the first ledge and the second ledge such that the locking finger extends in spaced and generally parallel relationship to each of the first leg and the second leg.

20. A vehicle, as set forth in claim 11, wherein the first body panel includes a datum pin;

wherein the end bracket is configured to abut the datum pin of the first body panel to locate the instrument panel in an up/down direction and a fore-aft/direction.

* * * * *